United States Patent [19]

Magaritz et al.

[11] Patent Number: 4,647,259

[45] Date of Patent: Mar. 3, 1987

[54] SEALING PONDS AND RESERVOIRS BY NATURAL MATERIALS

[75] Inventors: Mordeckai Magaritz; Lior Goldenberg, both of Rehovot; Shmuel Mandel, Ramat Gan; Abraham J. Amiel, Moshav Ramot Meir, all of Israel

[73] Assignee: Yeda Research and Development Co. Limited, Rehovot, Israel

[21] Appl. No.: 583,260

[22] Filed: Feb. 24, 1984

[30] Foreign Application Priority Data

Feb. 25, 1983 [IL] Israel ............................................. 67996

[51] Int. Cl.[4] .......................... C09K 17/00; E02D 3/12
[52] U.S. Cl. ...................................... 405/270; 405/263
[58] Field of Search ................ 405/38, 53, 55, 57, 405/58, 128, 129, 258, 263, 264, 270; 166/292

[56] References Cited

U.S. PATENT DOCUMENTS

| 2,863,509 | 12/1958 | Messenger | 166/292 |
|---|---|---|---|
| 3,124,472 | 3/1964 | Hemwall | 405/270 |
| 3,175,611 | 3/1965 | Hower | 166/292 |
| 3,490,241 | 1/1970 | Kuhn | 405/263 |
| 3,959,975 | 6/1976 | Graf | 405/263 |
| 4,222,685 | 9/1980 | Jefferson et al. | 405/270 |
| 4,344,722 | 8/1982 | Blais | 405/270 |

FOREIGN PATENT DOCUMENTS

| 489011 | 12/1952 | Canada | 405/263 |
|---|---|---|---|
| 601901 | 7/1960 | Canada | 166/292 |
| 781321 | 11/1980 | U.S.S.R. | 166/292 |

OTHER PUBLICATIONS

McNeal, B. L. et al, 1966, Soil Sci., Soc. Am. J., 30, 308.
Frenkel, H. et al, 1978—Soil Sci. Am. J., 42, 32.
Prather, R. I. et al—1978, Soil Sci. Am. J., 45, 273.
Pupisky, H. et al—Soil Sci. Soc. of Am. J., 43, 429; May-Jun. 1979.

Primary Examiner—Cornelius J. Husar
Assistant Examiner—Nancy J. Stodola
Attorney, Agent, or Firm—Browdy and Neimark

[57] ABSTRACT

There is provided a process for rendering certain layers impervious to the seepage of water through same. Such layers are of value in preventing water seepage into structures, and also from ponds, from water reservoirs and the like. The water impervious layers are produced from mixtures of sand (about 98.5 to 90 weight percent) and montmorillonite (about 1.5 to 10 weight percent), which are compacted and contacted with salt water having a salt content at least equal to that of sea water, and washing the layer until the wash waters are essentially free of sodium.

10 Claims, No Drawings

SEALING PONDS AND RESERVOIRS BY NATURAL MATERIALS

BACKGROUND OF THE INVENTION

There exist two main systems for the sealing of ponds. The first makes use of natural materials, such as clay minerals or more specifically Na-bentonite: or soils rich in clay, salts or polymers (Prickett, 1968, FAO; Wilson, K. J., 1966, Am. Soc. of Civil Eng. Denver; Banin, A., 1976, Fac. Agri. Heb. Univ. Jerusalem; Garbotz, G., 1966. Con. Jour.). The second system is based on the use of artificial coverings of ponds, for example asphalt, plastic films: polyethylene, P.V.C. and synthetic rubber (Frobel, R. K., Clugg, C. B., 1976, Jour Irri. Drain Div; Hickey, M. E., 1969, U.S.D. Int. Bur. Rec. R.R.19; Kumar, J., Jedlick, A. 1973, Agri. Res.Ser. USDA).

The first system suffers from seepage of water, reaching several percentages of water loss per volume. In cases in which sewage water is restored there exists the danger that such water will reach the aquifer and contaminate it. The artificial materials used for sealing are more reliable but much more expensive than the natural ones.

In many studies (McNeal, B. L. and Coleman, M. T., 1966, Soil Sci. Soc. Am. J. 30, 308; Frankel H. et al., 1978, Soil Am. J. 42,32; Porather, R. I. et al., 1978, Soil Sci. Am. J. 45,273; Pupisky H. and I Shainberg, Soil Sci Soc. of Am. J. 43,429), the combination of soil material and clay with the addition of Na salts, was found to minimize the hydraulic conductivity of porous media. However, the exact percentages of clay and sand were not specified. Absolute saturation of the clay by Na was never attained, nor obviously the absolute sealing of the soil, and its application for water reservoirs.

SUMMARY OF THE INVENTION

According to the present invention there is provided a method for the nearly absolute sealing of ponds and reservoirs. The method obtains a substantial decrease in hydraulic conductivity as a result of the mixing of dune sand with a very small amount of clay of the montmorillonite type, washing this mixture with seawater, followed by washing with fresh water. The result of this process leads to the decrease of hydraulic conductivity to very low values of the order of $10^{-7}$ cm/sec.

The process of the invention comprises four steps:
a. Mixing sand of dune type with about 5% of montmorillonite,
b. Compressing this mixture to reach a specific gravity of at least 1.6;
c. Washing the mixture with a solution of about the ionic strength and composition of seawater; and
d. Washing the mixture with fresh water until the percolating water has an electric conductivity of fresh water.

The present invention provides a very inexpensive method for the sealing of ponds and reservoirs, for fresh water. The cost of this method is only 1/100 up to about 1/20 of the methods based on the use of artificial materials.

The mixture is advantageously saturated with a suitable salt solution, such as sea-water or brine, and washed afterwards until any excess of salt is washed out. The range of sand to montmorillonite is between about 98.5% to 90% sand to about 1.5% to 10% montmorillonite. A preferred ratio is about 95% sand to about 5% montmorillonite. The sand should be of the order of about 100 to 300$\mu$ mean diameter, or coarser.

The thickness of the sealing layer varies with the nature of the intended application; generally layers of from 5 to 30 centimeters have been found to be adequate for practically eliminating seepage of water.

The montmorillonite is contacted with the sea-water or brine solution until practically all the exchangeable sites are saturated with Na$^+$ ions, and afterwards the resulting product is washed with water until the wash water has a conductivity of less than 750 mmho, resulting in a layer which has a hydraulic conductivity of about $10^{-7}$ cm/sec.

The invention is illustrated with reference to the following examples, which are to be construed in a non-limitative manner:

Example of the preparation of the sealing layer and its characteristics.

Dune type sand of about 200$\mu$ mean diameter was mixed with about 5 by weight-% of montmorillonite, compressed to a density of 1.65 and washed with sea water until exchangeable sites of the clay are saturated with Na$^+$ ions.

Subsequently the storage area, prepared as above is flooded with fresh water which penetrates into the sand mixture and causes deflocculation of the clay minerals thus rendering the surface layer impervious.

The volume of both sea water and fresh water required is roughly 3 times the pore volume of the mixed layer. This bottom layer is approximately 5 cm to 30 cm thick and only minimal losses of water took place through it.

Experiments were carried out to determine the feasibility of sealing tunnel structures, like those of underground trains, against water seepage from the outside. These were fully successful.

Layers of sand/montmorillonite rendered impervious as set out above can be used for the storage of radioactive waste, preventing percolation into deeper layers of groundwater.

We claim:

1. A process for the production of practically impervious bottom layers for use in ponds, in water reservoirs for fresh water and for prevention of seepage of aqueous solutions, which comprises preparing a mixture of from 98.5-weight-% to 90-weight-% of sand with 1.5 weight-% to 10-% montmorillonite, compacting the mixture to a density of at least 1.6, contacting the mixture with salt water of an ionic strength of at least that of sea water until there is attained a full exchange of the exchangeable sites of the montmorillonite for sodium ions, and washing the product until the wash water is essentially free of sodium.

2. A process according to claim 1 wherein a mixture of 95% sand of 200$\mu$ mean diameter and 5% of montmorillonite is used.

3. A process according to claim 1 wherein the impervious layer has a thickness of between 5 to 30 cm.

4. A process according to claim 1 wherein the brine solution has a high ionic strength and a composition equivalent to that of sea water.

5. A process according to claim 1 wherein essentially total saturation of the exchangeable sites of the montmorillonite by Na$^+$ is attained.

6. A process according to claim 1 wherein the layer is washed to obtain full leaching of the soluble salts up to a conductivity of about 760 mmho.

7. A process according to claim 1 wherein the impervious sealing layer has a hydraulic conductivity of less that $10^{-7}$ cm/sec.

8. A sealed bottom layer for ponds, reservoirs and for isolation against water seepage formed by a process of claim 1.

9. The process of claim 1 wherein said mixture is formed into a bottom layer prior to said contacting step.

10. The process of claim 2 wherein said mixture is formed into a bottom layer prior to said contacting step.

* * * * *